United States Patent
Pavlyushchik

(10) Patent No.: US 7,392,544 B1
(45) Date of Patent: Jun. 24, 2008

(54) METHOD AND SYSTEM FOR ANTI-MALWARE SCANNING WITH VARIABLE SCAN SETTINGS

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 11/958,624

(22) Filed: Dec. 18, 2007

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .......................... 726/24; 713/187; 713/188

(58) Field of Classification Search ................... 726/24; 713/187, 188
See application file for complete search history.

(56) References Cited

U.S. PATENT DOCUMENTS 5,960,170 A    9/1999   Chen et al.

2003/0135791 A1    7/2003   Natvig

Primary Examiner—Nasser Moazzami
Assistant Examiner—David Garcia Cervetti
(74) Attorney, Agent, or Firm—Bardmesser Law Group

(57) ABSTRACT

A system, method and computer program product for scanning an executable file for malware presence, the method comprising: (a) detecting an attempt to execute a file on a computer; (b) identifying whether the file is known or unknown; (c) if the file is a known file, performing a signature malware check; (d) if the file is an unknown file, performing risk analysis and risk assessment for the file; (e) based on the risk analysis and the risk assessment, identifying which malware detection algorithms need to be used for the file, in addition to signature detection; (f) performing the malware detection algorithms on the file; and (g) if no malware is detected, permitting execution of the file. The risk analysis is based on file source, file origin, file path, file size, whether the file is digitally signed, whether the file is a download utility, whether the file is packed, whether the file was received from a CDROM.

20 Claims, 2 Drawing Sheets

METHOD AND SYSTEM FOR ANTI-MALWARE SCANNING WITH VARIABLE SCAN SETTINGS

BACKGROUND OF THE INVENTION

1. Field of the Invention

The present invention is related to anti-malware technology, and more particularly, to balancing relatively quick (but less thorough) anti-malware checks with more thorough, but also more time-consuming, anti-malware checks.

2. Description of the Related Art

One of the problems in the field of anti-virus software is the fact that many users are unwilling to wait for a long time for the anti-virus software to do its work. As a practical matter, most users are willing to wait a fraction of a second, perhaps a second or two, when starting an application, but are rarely willing to wait substantially longer than that. On the other hand, in such a relatively short period of time, only the more rudimentary anti-virus checks are possible. This presents a problem for the anti-virus software vendor, because the need to check the executable file being launched for viruses must be balanced against the amount of time that a thorough anti-virus check would take.

Accordingly, there is a need in the art for a system and method for a more effective antivirus check of new programs that carry a higher risk of virus infection.

SUMMARY OF THE INVENTION

The present invention is intended as a method and system to test executable files for malware presence where the amount that substantially obviates one or several of the disadvantages of the related art.

In one aspect of the invention there is provided a system, method, and computer program product for scanning an executable file for malware presence, the method comprising: (a) detecting an attempt to execute a file on a computer; (b) identifying whether the file is known or unknown; (c) if the file is a known file, performing a signature malware check; (d) if the file is an unknown file, performing risk analysis and risk assessment for the file; (e) based on the risk analysis and the risk assessment, identifying which malware detection algorithms need to be used for the file, in addition to signature detection; (f) performing the malware detection algorithms on the file; and (g) if no malware is detected, permitting execution of the file.

The risk analysis is based on any of file source, file origin, file path, file size, whether the file is digitally signed, whether the file is a download utility, whether the file is packed, and whether the file was received from a CDROM. The malware detection algorithms include any of heuristic detection algorithms, statistical analysis, sending a copy of a file to a server for anti-malware check, sending a control value generated based on the file to the server for anti-malware check, instruction-based emulation, and environment-based emulation.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
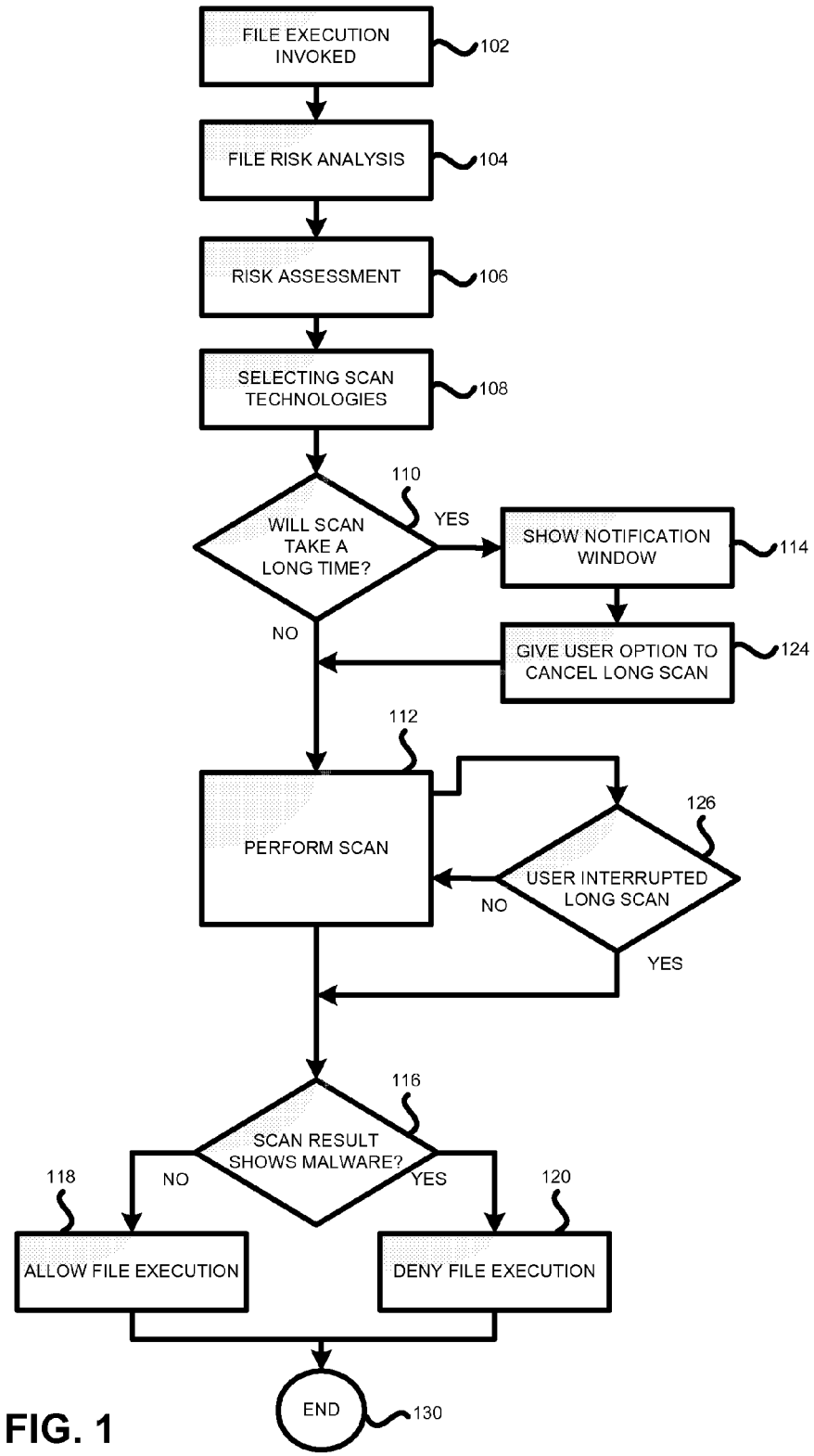
FIG. 1 illustrates a flow chart of one embodiment of the invention.

Reference will now be made in detail to the preferred embodiments of the present invention, examples of which are illustrated in the accompanying drawings.

In one embodiment of the invention, a system and method for antivirus checking is proposed that differentiates between the known executable files (i.e., files which the antivirus software has previously encountered in some sense on this machine) and unknown executable files. As such, when the software that is known to the anti-virus program (for example, a previously installed copy of Microsoft Word) is launched, the anti-virus verification is relatively short—for example, limited to only virus signature checks of the dynamic linked libraries. On the other hand, when the software that is unknown to the anti-virus program is launched for the first time, more exhaustive antivirus checking can be performed. In this case, the user can be informed, for example, through a pop-up window or a similar interface, that the program to be launched is new and has a higher than a normal risk of being infected by a virus. The user can then be given an option either to do a full check or to skip the full check, and be limited to only a relatively quick anti-virus scan. If the user chooses a more thorough scan, then the full range of available anti-virus detection mechanisms can then be applied—for example, signature analysis, heuristics analysis and so on. Another choice is to apply a most appropriate scan method from the anti-virus program's point of view automatically, while giving the user an option to cancel or minimize the scan.

In fact, when a new piece of software appears on the Internet for downloading (either from legitimate vendors or from hackers distributing malware), it takes anywhere from 15 minutes to 2 hours to update the databases of the anti-virus software vendors. During that time an additional check that can be performed is checking, with a server, whether the particular software that the user has just downloaded and is trying to install for the first time, is on a whitelist or a blacklist.

Being on a blacklist means that the newly downloaded software has a relatively high probability of containing a virus—either because the source of the software is a priori known to be a source of malware, or because earlier such software was frequently infected, or due to any number of reasons.

Being on a whitelist can mean that the source of the software, or the type of the software, is one that even without further checks, is not likely to contain a virus; in this case, the remainder of the anti-virus scan can be restricted to the more basic variety. If the software is on neither the blacklist nor the whitelist, then a recommendation should be made to the user to make a scan with all available techniques.

As yet a further option, the degree of anti-virus scans (and therefore the total amount of time that such scans would take) can depend on how the 'newly' acquired software arrives on the computer—for example, software that is distributed on a storage medium, such as a CD ROM or a DVD-ROM, is less likely to be infected by viruses and software than is distributed through the Internet. This can also be a differentiator for the degree of anti-virus scanning performed on the executable file. As yet a further option, the user can manually choose to run some of the anti-virus scans in the background after the new software has been launched, but not necessarily the entire spectrum of available technologies, which obviously increases the risk that a virus can infect the computer. This may still be preferable to behavior that is, unfortunately, common for many users, where the users "take chances" that the software is not infected. On the other hand, it is possible that even if there is a virus, a subsequent anti-virus scanning that occurs in the process, even after the launching of the new software, can identify the presence of a virus and cure it.

Thus, in one embodiment, for each file to be executed, different settings are selected, depending on the file and the fact whether the file is 'known' to the system. For example, for the known files, the antivirus check can be relatively short, while for unknown files the antivirus check can be more exhaustive, in other words, when the file is encountered for the first time. For unknown files, a risk assessment can be performed based on the factors described above, and the risk analysis and risk assessment take into account various factors associated with the executable file, to generate a metric, and a more exhaustive, or less exhaustive, anti-virus check is performed.

Another factor can be the source of the file. For example, a file that 'arrived' on the computer on a CD ROM is much less likely to be infected than a file downloaded from the Internet. For the downloaded files, the source of the download, such as the URL, should preferably be considered. Whether the file is packed can also become a factor of risk, since malware files are often packed, in order to defeat the signature-based method of virus detection. The current location and/or path to the file can also be considered, in the event when some particular executable files install themselves in a particular directory, especially those directories that are infrequently used.

Still another factor to consider is the size of the file. For example, a relatively small executable file executed for the first time is much more suspicious than a large executable file. This is due to the fact that transmission of large multi-megabyte infected files is frequently impractical, particularly from unsuspecting 'zombified' computers. If a zombified computer sends out very large infected files, it will not be able to send very many of them, if only due to hardware and bandwidth limitations. On the other hand, sending a large number of emails with a relatively small attachment is much more practical. Typical malware files sent out in this manner are on the order of 50-100 kilobytes (which, if packed, reduces to something on the order of 20-50 kilobytes).

Another risk factor that can be considered is to check whether a relatively small executable file is itself an installer file—in other words, the file, although small, triggers a process of downloading a relatively large executable file from a web server or a file server on the Internet. Yet another factor in the risk analysis can be how the file was created, e.g., which process created this file, whether another file had been downloaded prior to this file being created on the disk—thus, knowing the URL of the downloaded file, the risk of the file that was just created can be assessed. Also, which directory/folder the file was created in (e.g., Temporary Internet Files is a higher risk than My Documents, root directory is higher risk than a lower-level directory) is another factor.

Yet another factor is whether a file is digitally signed, or not (with the unsigned files, presumably, being more suspicious than signed ones).

Options for a more detailed anti-virus and anti-malware scan can include heuristics analysis, emulation of the files executable code, including emulation in an isolated environment, or instruction-based emulation, where the emulator only steps through the particular instructions in the executable code, such as in a debugging mode. Another option can be a statistical analysis of the file, for example, for occurrence of a particular instruction pattern and/or frequency of particular instructions or groups of instructions (particularly applicable to detection of polymorphic viruses, which are impossible to detect using the signature method). Other techniques include an online check of the file—where either the file itself, or a control sum generated from the file (such as a hash or a CRC), or some portion of the file (e.g., the first X bytes and the last Y bytes) is sent to a third party server, such as an anti-virus vendor, and is analyzed there.

FIG. 1 illustrates a flowchart according to one exemplary embodiment of the invention. As shown in FIG. 1, in step 102, execution of a file is first invoked. In step 104, risk analysis is performed, using various techniques to determine risks (for example, URL-based analysis is one risk factor, file size analysis is another factor, and so on). In step 106, the risk assessment is performed, where different metrics are aggregated to determine whether the file is a high risk, medium risk or low risk (for example). In step 108, the system selects which antivirus scans it believes would be most appropriate, given the risk analysis and risk assessment above.

In step 110, if the antivirus scan is expected to take a long time, then a notification window is shown to the user (step 114), and, in step 124, the system gives the user an option to cancel a lengthy scan, if the user prefers to do so. In step 112, the scan is performed, unless the user has chosen to cancel it. As an option, the notification window can be shown to the user, indicating the progress of the antivirus scan and optionally giving an indication of how much time is left before the completion of the scan. The user has an option to interrupt the scan (step 126).

In step 116, if the scan results indicate that a malware is present, or is likely to be present, then, in step 120, execution of the file is blocked, and the process terminates, in step 130. In step 116, if no malware is detected, then, the file execution is permitted, in step 118, and the antivirus check is completed in step 130.

Figure 2:
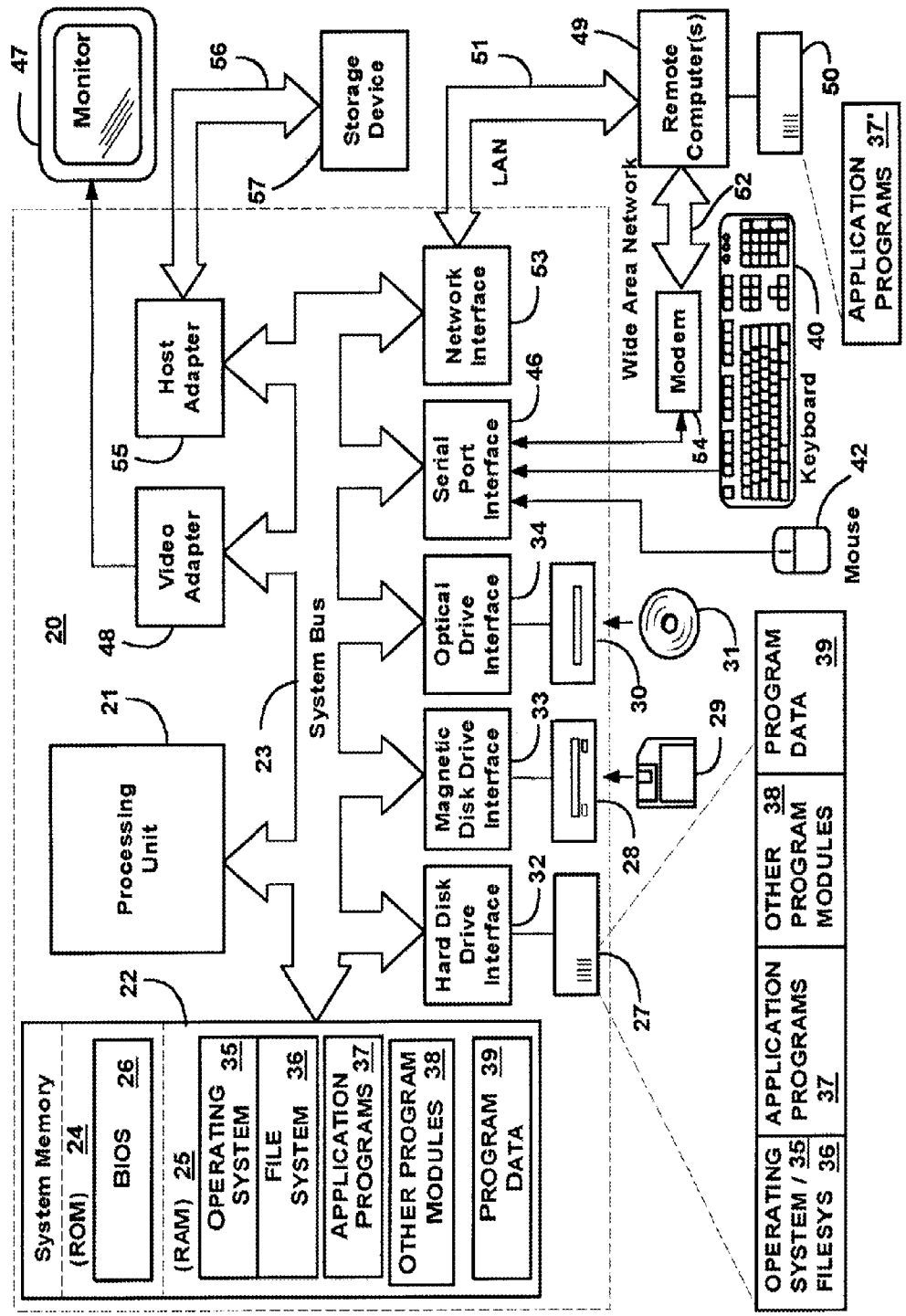
FIG. 2 illustrates a schematic of an exemplary computer system on which the anti-malware invention can be implemented.

With reference to FIG. 2, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules/subroutines, where each of the steps described above can be a separate module, or several steps can be aggregated into a single module, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 coupled to the system bus, and can be connected by other interfaces, such as a parallel port, game port or universal serial bus (USB). A monitor 47 or some other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be represented by another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are common in offices, enterprise-wide computer networks, Intranets and the Internet.

When used in a LAN networking environment, the personal computer 20 is connected to the local network 51 through a network interface or adapter 53. When in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus can be achieved. It should also be appreciated that various modifications, adaptations and alternative embodiments thereof may be made within the scope and spirit of the present invention. The invention is further defined by the following claims.

What is claimed is:

1. A method for scanning an executable file for malware presence, the method comprising:
    (a) detecting an attempt to execute a file on a computer;
    (b) identifying whether the file is known or unknown;
    (c) if the file is a known file, performing a signature malware check;
    (d) if the file is an unknown file, performing risk analysis and risk assessment for the file;
    (e) based on the risk analysis and the risk assessment, identifying which malware detection algorithms need to be used for the file, in addition to signature detection;
    (f) performing the malware detection algorithms on the file; and
    (g) if no malware is detected, permitting execution of the file.

2. The method of claim 1, wherein the risk analysis is based on any of file size, file format, file structure, whether the file is digitally signed, whether the file is a download utility, whether the file is packed, file source, and whether the file was received from a CDROM.

3. The method of claim 1, wherein the risk analysis is based on a URL from which the file was received.

4. The method of claim 1, wherein the risk analysis is based on file origin.

5. The method of claim 1, wherein the risk analysis is based on file path.

6. The method of claim 1, wherein the malware detection algorithms include any of heuristic detection algorithms, statistical analysis, sending a copy or some portion of the file to a server for anti-malware check, and instruction-based emulation.

7. The method of claim 1, wherein the malware detection algorithms includes a sending a portion of the file to a server for anti-malware check.

8. The method of claim 1, wherein the malware detection algorithms include sending a control value generated based on the file to the server for anti-malware check.

9. The method of claim 1, wherein the malware detection algorithms include an environment-based emulation.

10. A computer useable recording medium having computer executable program logic stored thereon, the computer executable program logic executing on a processor for implementing the steps of claim 1.

11. A system for scanning an executable file for malware presence, the system comprising:
    a processor;
    a memory;
    computer code loaded in the memory for performing the steps of:
    (a) detecting an attempt to execute a file on a computer;
    (b) identifying whether the file is known or unknown;
    (c) if the file is a known file, performing a signature malware check;
    (d) if the file is an unknown file, performing risk analysis and risk assessment for the file;
    (e) based on the risk analysis and the risk assessment, identifying which malware detection algorithms need to be used for the file, in addition to signature detection;
    (f) performing the malware detection algorithms on the file; and (g) if no malware is detected, permitting execution of the file.

12. The system of claim 11, wherein the risk analysis is based on any of file size, file format, file structure, whether the file is digitally signed, whether the file is a download utility, whether the file is packed, and whether the file was received from a CDROM.

13. The system of claim 11, wherein the risk analysis is based on file source.

14. The system of claim 11, wherein the risk analysis is based on file origin.

15. The system of claim 11, wherein the risk analysis is based on file path.

16. The system of claim 11, wherein the malware detection algorithms include a heuristic detection algorithm.

17. The system of claim 11, wherein the malware detection algorithms include statistical analysis.

18. The system of claim 11, wherein the malware detection algorithms include instruction-based emulation.

19. The system of claim 11, wherein the malware detection algorithms include sending a copy of the file or a portion of the file, or a control value generated based on the file, to a server for anti-malware check.

20. The system of claim 11, wherein the malware detection algorithms include an environment-based emulation.

* * * * *